(12) United States Patent
Oswald et al.

(10) Patent No.: US 11,004,228 B2
(45) Date of Patent: May 11, 2021

(54) IMAGE BASED TRAIN LENGTH DETERMINATION

(71) Applicant: Westinghouse Air Brake Technologies Corporation, Wilmerding, PA (US)

(72) Inventors: James A. Oswald, Coggon, IA (US); Benjamin L. Henniges, Mt. Airy, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 221 days.

(21) Appl. No.: 16/193,209

(22) Filed: Nov. 16, 2018

(65) Prior Publication Data

US 2020/0160549 A1 May 21, 2020

(51) Int. Cl.
*G06T 7/60* (2017.01)
*G06F 16/532* (2019.01)
*G06F 16/29* (2019.01)

(52) U.S. Cl.
CPC .............. *G06T 7/60* (2013.01); *G06F 16/532* (2019.01); *G06F 16/29* (2019.01); *G06T 2207/30252* (2013.01)

(58) Field of Classification Search
None
See application file for complete search history.

(56) References Cited

U.S. PATENT DOCUMENTS

| 10,151,582 | B1 * | 12/2018 | Jovenall | G01M 17/10 |
| 2002/0010531 | A1 * | 1/2002 | Hawthorne | B61L 23/047 |
| | | | | 701/19 |
| 2007/0183763 | A1 * | 8/2007 | Barnes | G03B 15/00 |
| | | | | 396/55 |
| 2007/0216771 | A1 * | 9/2007 | Kumar | B61L 23/047 |
| | | | | 348/148 |
| 2007/0217670 | A1 * | 9/2007 | Bar-Am | B61L 23/041 |
| | | | | 382/141 |

(Continued)

FOREIGN PATENT DOCUMENTS

| GB | 2527330 A | * 12/2015 | ............ B61L 25/021 |
| JP | 2011242268 A | * 12/2011 | |
| WO | WO-2018095939 A1 | * 5/2018 | ............ B61L 25/021 |

OTHER PUBLICATIONS

Measuring distance with a single photo, Jul. 26, 2017, University College London, UK.

(Continued)

*Primary Examiner* — Delomia L Gilliard
(74) *Attorney, Agent, or Firm* — Philip S. Hof; The Small Patent Law Group, LLC

(57) ABSTRACT

In a method of determining a length of a train, a first camera at the head of the train acquires a first image of a first object on or proximate a path of the train and a second camera at the end of the train acquires a second image of a second object on or proximate the path of the train. A controller determines a length of the train based on a first geographical location associated with the first object in the first image and a second geographical location associated with second object in the second image. The first and second geographical locations of the first and second objects can be determined from corresponding prerecorded images of the objects that are geotagged with the geographical locations of the objects.

20 Claims, 8 Drawing Sheets

(56) References Cited

U.S. PATENT DOCUMENTS

| | | | | |
|---|---|---|---|---|
| 2008/0007724 | A1* | 1/2008 | Chung | G01B 11/14 356/237.1 |
| 2010/0063734 | A1* | 3/2010 | Kumar | B61L 25/025 701/300 |
| 2010/0268466 | A1* | 10/2010 | Amutham | B61L 25/025 701/301 |
| 2012/0018591 | A1* | 1/2012 | Ghaly | B61C 17/12 246/192 R |
| 2013/0297199 | A1* | 11/2013 | Kapp | G08G 1/123 701/411 |
| 2014/0247356 | A1* | 9/2014 | Forni | B60R 11/04 348/148 |
| 2015/0008294 | A1* | 1/2015 | Desbordes | G06T 7/20 246/122 R |
| 2016/0046308 | A1* | 2/2016 | Chung | B61L 25/021 701/20 |
| 2017/0161568 | A1* | 6/2017 | Karlsson | B61L 27/0094 |
| 2018/0314913 | A1* | 11/2018 | Qian | G06K 9/6215 |
| 2019/0248392 | A1* | 8/2019 | Bar-Tal | B61L 25/025 |
| 2020/0108847 | A1* | 4/2020 | Oswald | B61L 25/026 |
| 2020/0158656 | A1* | 5/2020 | Chung | B61L 15/0027 |
| 2020/0210715 | A1* | 7/2020 | Golomedov | G06K 9/00818 |

OTHER PUBLICATIONS

Cremer, Jeff, How to measure the distance to an object in a photo?, Rainforest Expeditions, Mar. 30, 2013, Lima, Peru.
Emara, Taha, Real-Time Distance Measurement Using Single Image (/blog/distance-measurement), Emaraic, Mar. 11, 2018.

* cited by examiner

IMAGE BASED TRAIN LENGTH DETERMINATION

BACKGROUND OF THE INVENTION

Field of the Invention

The present invention relates to determining train length and, more particularly, to determining train length from images acquired by train mounted cameras.

Description of Related Art

One aspect of positive train control (PTC) that is of concern is any reliance on crew input where a human could make a mistake that might jeopardize safe operation. PTC presently relies on the crew to validate train consist information from a back office. This consist data is important to PTC in order to ensure safe operation of the train. Errors in consist information can affect, among other thing, the brake algorithm and could result in the train overrunning a target or all or portions of the train operating at an unsafe speed.

Train length is one attribute of the consist information. Errors in train length can affect enforcement operation by allowing a train to speed up out of a train speed restriction area too soon. Additionally, errors in consist length could allow the train to foul tracks unintentionally or release authority that is not yet cleared.

SUMMARY OF THE INVENTION

Generally, provided is a method for determining train length from images acquired by cameras at the front of a train and at the back or rear of the train.

In one preferred and non-limiting embodiment or example, disclosed herein is the use of a rear facing camera mounted on or proximate the end of a train, e.g., a camera of an end-of-train (EOT) device of a train, in combination with a camera already mounted on the locomotive, and using machine vision techniques, to validate the length of the train. In one preferred and non-limiting embodiment or example, using a track database for situational awareness of features of and along the track, a front facing camera mounted on the locomotive can acquire an image of a particular object, such as, for example, a signal mast or switch point, and a controller can determine a first distance from the front facing camera to said object using machine vision techniques. As the train moves down the track, the rear facing camera can acquire an image of the same object and the controller can determined a second distance from the rear facing camera to the object as the train passes using machine vision techniques. Having tracked the distance the train has traveled, the first and second distances can be used to compute/validate the length of the train.

In one preferred and non-limiting embodiment or example, this approach can work statically without the train moving when the track database confirms that features acquired by the front and rear facing cameras are unique enough that positive identity and location are assured.

In one preferred and non-limiting embodiment or example, having a validated train length can improve braking accuracy by properly modeling propagation time for brake pipe pressure changes. Additionally, having a validated train length can improve the ability of the PTC to safely release (roll up) authorities and confirm clearance of switches and sidings.

In one preferred and non-limiting embodiment or example, images acquired by the rear facing camera, when coupled with a track database that identifies clearance points for switches, can be used to confirm that the rear of the train is clear of a particular object, such as, for example, a track, and not fouling it. The rear facing camera, coupled with a machine vision technique, can detect a switch and identify the distance to it. Then, comparing that distance to clearance point locations in the track database, positive clearance can be confirmed. This technique can also be used for authority roll up and release.

In one preferred and non-limiting embodiment or example, the rear facing camera coupled with a machine vision technique can detect the state of a signal that has just been passed. As a train clears the signal, looking backward, the signal for the opposite direction of travel should clear. The rear facing camera can monitor for this and be used to report a block that did not clear indicating that something may still be fouling the block. This information can be relayed through a back office and used to warn other trains operating in or about to enter the block.

In one preferred and non-limiting embodiment or example, correct switch position can be monitored. In an example, some switches are not monitored and require manual hand throw operation to align for proper movement. When a train might be parked near a switch while awaiting hand thrown alignment, a rear facing camera mounted on the train, coupled with a machine vision technique, can detect human movement around a switch and thereby monitor the alignment of the switch. That alignment could be reported to a back office as confirmation that the switch is in the proper position for future train movements.

In one preferred and non-limiting embodiment or example, these ideas, utilizing a rear facing camera, can be used to improve the safety of railroad operations and reduce the chance of a human error input to PTC that might result in PTC failing to protect the train from speed or movement limitations.

In one preferred and non-limiting embodiment or example, this invention can be used on any PTC equipped train having a camera at the back or rear end of the train to improve safety, not only for PTC operation but for other conventional train operations.

In one preferred and non-limiting embodiment or example, GPS data can trigger when the rear facing camera should be "looking" for visual markers. For example, the PTC system with locomotive position, track database, and train length can trigger when the rear facing camera should be "looking" for visual markers.

Further preferred and non-limiting embodiments are set forth in the following numbered clauses.

Clause 1: A method of determining a length of a train comprising a plurality of cars, the train including a controller, comprising one or more processors, a first camera at a head of the train, and a second camera at an end of the train, the method comprising: (a) acquiring, by the first camera at the head of the train, a first image of a first object on or proximate a path of the train; (b) acquiring, by the second camera at the end of the train, a second image of a second object on or proximate the path of the train; and (c) determining, by the controller, a length of the train based on a first geographical location associated with the first object in the first image and a second geographical location associated with second object in the second image. In an example, each camera can be a video camera or can capture one or more still images.

Clause 2: The method of clause 1 can further include the first and second images being acquired while the train is travelling along the path of the train, wherein step (c) can include determining the length of the train based on a distance travelled by the train between the acquisition of the first and second images including the first and second objects.

Clause 3: The method of clause 1 or 2, wherein: the first and second objects can be the same object; and the first and second geographical locations can be the same geographical locations.

Clause 4: The method of any one of clauses 1-3, wherein: the first object and the second object can be different objects; and the first and second geographical locations can be the different geographical location.

Clause 5: The method of any one of clauses 1-4, wherein step (c) can include: (c)(1) searching a track database for a match between the object appearing in each image and a corresponding representation of the object stored in the track database that is geotagged with a geographical location; (c)(2) based on a match between the object in each image and a corresponding object representation stored in the database, associating the geotagged geographical location associated with the object representation as the geographical location of the object, whereupon the first object is associated with the first geographical location and the second object is associated with the second geographical location; and (c)(3) determining the length of the train based on a distance between the first geographical location and the second geographical location.

Clause 6: The method of any one of clauses 1-5, wherein each representation of the object stored in the track database can be another image of said object.

Clause 7: The method of any one of clauses 1-6, wherein, in step (c)(3), determining the length of the train can be based on a path of the train between the first geographical location and the second geographical location Clause 8: The method of any one of clauses 1-7, wherein the path of the train can include one or more of the following: a straight section, a curved section, or both Clause 9: The method of any one of clauses 1-8, wherein step (c) can include: determining from the first image the first geographical location of the first object; determining from the second image the second geographical location of the second object; and determining the length of the train based on a distance between the first and second geographical locations.

Clause 10: The method of any one of clauses 1-9 can further include the first and second images being acquired while the train is stationary.

Clause 11: The method of any one of clauses 1-10, wherein the length of the train can be determined based on a distance of the path of the train between the first and second geographical locations.

Clause 12: The method of any one of clauses 1-11 can further include determining, by the controller, at least one of the following: a distance from the first camera to the first object; a distance from the second camera to the second object; or both.

Clause 13: The method of any one of clauses 1-12 can further include: acquiring, by the second camera, at least two images of the second object; determining, by the controller, based on the at least two images of the second object acquired by the second camera, that the second object has changed state (e.g., a switch change of state); and communicating, by the controller via a communication link to another controller of another train, data that the second object has changed state.

Clause 14: The method of any one of clauses 1-13 can further include: acquiring, by the second camera, at least two images of the second object; determining, by the controller, based on the at least two images of the second object acquired by the second camera, that the second object has not changed state (e.g., a signal not changing state); and communicating, by the controller via a communication link to another controller of another train, data that the second object has not changed state.

Clause 15: The method of any one of clauses 1-14, wherein: the communication link can a wired connection, a wireless connection, or a combination wired and wireless connection; and the communication link can communicatively couple the controller and the other controller directly or via a separate communication node, e.g., a back office.

Clause 16: The method of any one of clauses 1-15 can further include: (d) acquiring, by the controller from a GPS receiver mounted on the train as the train travels proximate the second object, GPS coordinates of the GPS receiver; (e) determining, by the controller, whether the acquired GPS coordinates are within a predetermined distance of the second geographical location; and (f) controlling at least one operation of the train based on the determination in step (e).

Clause 17: The method of any one of clauses 1-16, wherein step (c) can include: (c)(1) searching a track database for a match between the second object appearing in the second image and a corresponding representation of the second object stored in the track database, wherein the track database includes a geographical location associated with the second object representation stored in the database; and (c)(2) based on a match between the second object in the second image and the corresponding second object representation stored in the database, associating the geographical location associated with the second object representation as the second geographical location of the second object.

Clause 18: The method of any one of clauses 1-17 wherein step (c) can further include: (c)(3) determining from the second image a distance from the second camera to the second object; and (c)(4) determining from the distance determined in step (c)(3) and the second geographical location of the second object determined in step (c)(2), an updated geographical location of the second camera.

BRIEF DESCRIPTION OF THE DRAWINGS

These and other features of the present invention will become more apparent from the following description in which reference is made to the appended drawings wherein.

DESCRIPTION OF THE INVENTION

Figure 1:
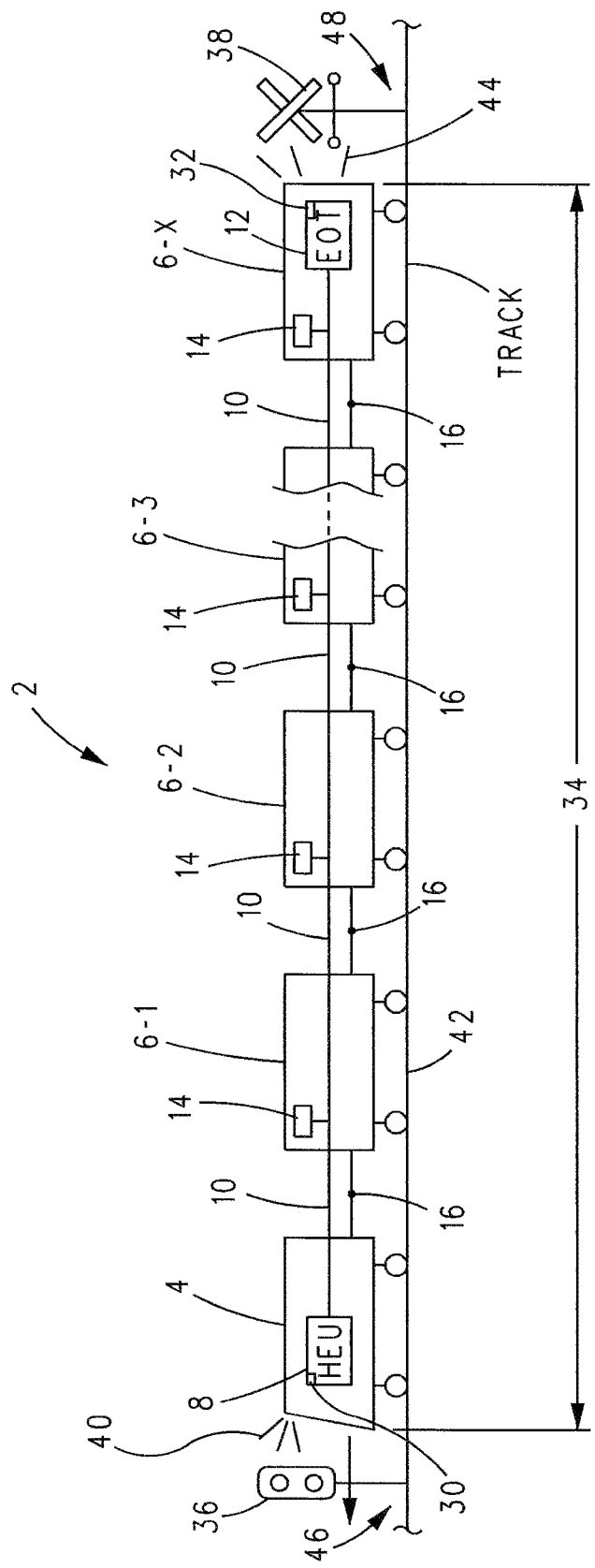
FIG. 1 is a schematic view of an example train on a path (or track) between a pair of objects positioned on or proximate the path.

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

With reference to FIG. 1, in one preferred non-limiting embodiment or example, a train 2 can include a locomotive 4 and a number of cars 6-1-6-X, where "X" can be any whole number greater than or equal to 2. In the example train 2 shown in FIG. 1, locomotive 4 is the lead vehicle of the train and car 6-X is the last vehicle of train 2. However, this is not to be construed in a limiting sense since it is envisioned that the lead vehicle of train 2 can be a car 6 other than locomotive 4, e.g., locomotive 4 can be positioned in train 2 between the lead vehicle and the last vehicle. For the purpose of the following description, locomotive 4 will be considered the lead vehicle of train 2.

In one preferred non-limiting embodiment or example, locomotive 4 can include a head-end-unit (HEU) 8. HEU 8 can be coupled via a trainline 10 to an end of train (EOT) device 12 which, in one preferred non-limiting embodiment or example, can be included in car 6-X. Optionally, HEU 8 can be coupled via trainline 10 to an electronically controlled pneumatic (ECP) controller 14 in each car 6. Each ECP controller 14 can, in a manner known in the art, respond to electronic braking commands from HEU 8 for controlling the brakes of each car, also in a manner known in the art.

In one preferred non-limiting embodiment or example, mechanical couplers 16 can be utilized to couple proximate cars 6 to each other and to couple locomotive 4 to car 6-1 in a manner known in the art. Train 2 can include additional elements known in the art which are not shown in the figures for the purpose of simplicity. For example, it is to be understood that locomotive 4 includes a motor or engine that is utilized to provide motive force to train 2.

Figure 2:
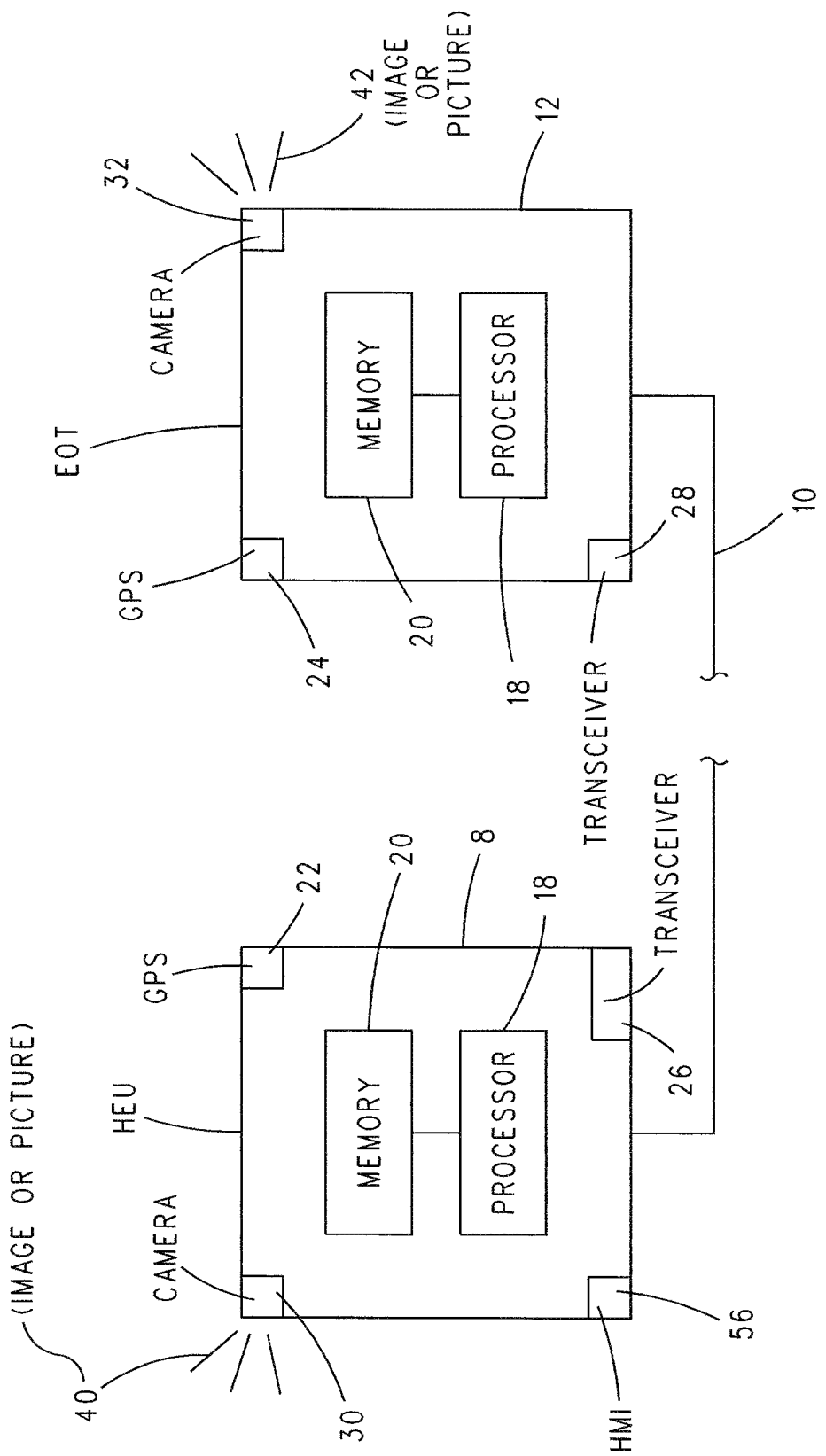
FIG. 2 is a schematic drawing of an example controller of the train shown in FIG. 1, including a pair of processors coupled to memory.

With reference to FIG. 2 and with continuing reference to FIG. 1, in one preferred non-limiting embodiment or example, trainline 10 acts in the nature of a communication network, such as, for example, without limitation, a local area network (LAN), between HEU 8 and at least EOT 12. EOT 12 is a device known in the art that can be mounted to the last vehicle of train 2, e.g., car 6-X, in lieu of a caboose. In one preferred non-limiting embodiment or example, EOT 12 can be the terminal end of trainline 10 opposite HEU 8. However, this is not to be construed in a limiting sense.

In one preferred non-limiting embodiment or example, HEU 8 and EOT 12 each include a processor 18 communicatively coupled to trainline 10 and a memory 20 coupled to processor 18 and operative for storing software control program(s) and/or operational data.

In one preferred non-limiting embodiment or example, herein, "controller" can include one or more processors 18 of HEU 8 and/or EOT 12 coupled to one or more memories 20. However, this is not to be construed in a limiting sense.

In one preferred non-limiting embodiment or example, each memory 20 can include dynamic, volatile memory, e.g., RAM, that loses program code and data stored therein when power to memory 20 is lost or when overwritten by the corresponding processor 18, and a non-volatile memory, e.g., ROM, flash memory and the like, the latter of which, (non-volatile) memory, can store, at least, an embedded operating system and embedded data for use by the corresponding HEU 8 or EOT 12 processor 18 in the presence or absence of power being applied to the non-volatile memory of said processor 18. In one preferred non-limiting embodiment or example, HEU 8 and EOT 12 can receive electrical power for their operation via trainline 10 from a battery or generator of locomotive 4.

In one preferred non-limiting embodiment or example, HEU 8 can include or be coupled to a GPS receiver 22 disposed in locomotive 4 and EOT 12 can include or be coupled to a GPS receiver 24 disposed in car 6-X.

In one preferred non-limiting embodiment or example, trainline 10 can be a wired network, a wireless network, or a combination of both a wired and a wireless network. In one preferred non-limiting embodiment or example, HEU 8 and EOT 12 can be in communication via transceivers 26 and 28 of HEU 8 and EOT 12.

In one preferred and non-limiting embodiment or example, HEU 8 can include or be coupled to a front facing camera 30 disposed in locomotive 4 and EOT 12 can include or be coupled to a rear facing camera 32 disposed in car 6-X.

In one preferred and non-limiting embodiment or example, in order to effect the safe operation of train 2, it can be desirable for the controller of train 2 to know a length 34 of train 2.

Figure 3:
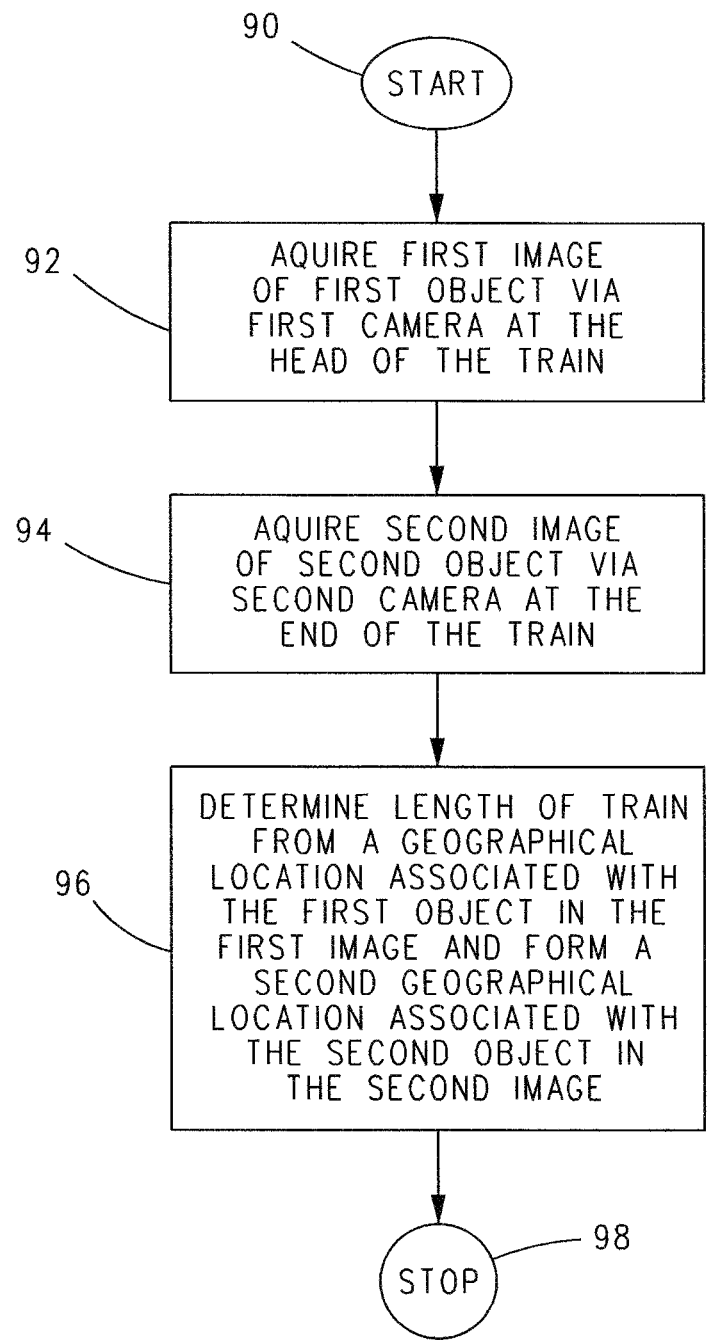
FIG. 3 is a flow diagram of an exemplary method in accordance with the principles of the present invention.

With reference to FIG. 3 and with continuing reference to FIGS. 1 and 2, in one preferred and non-limiting embodiment or example in accordance with the principles of the present invention, a method of determining the length of a train can advance from a start step 90 to step 92 wherein camera 30 positioned at the head of train 2 can acquire a first image (or picture) 40 of a first object 36 on or proximate a path 42 of train 2. In an example, path 42 can be a track comprised of one or more rails. However, this is not to be construed in a limiting sense.

The method can then advance to step 94 wherein camera 32 at the end of train 2 can acquire a second image (or picture) 44 of a second object 38 on or proximate path 42 of train 2. The method can then advance to step 96 wherein the controller of train 2 can determine length 34 of train 2 based on a first geographical location 46 associated with first object 36 in first image 40 and a second geographical location 48 associated with second object 38 in second image 44. The method can then advance to stop step 98.

In one preferred and non-limiting embodiment or example, first object 36 and second object 38 can be different objects, and the first and second geographical locations 46 and 48 can be different geographical locations.

Figure 4A:
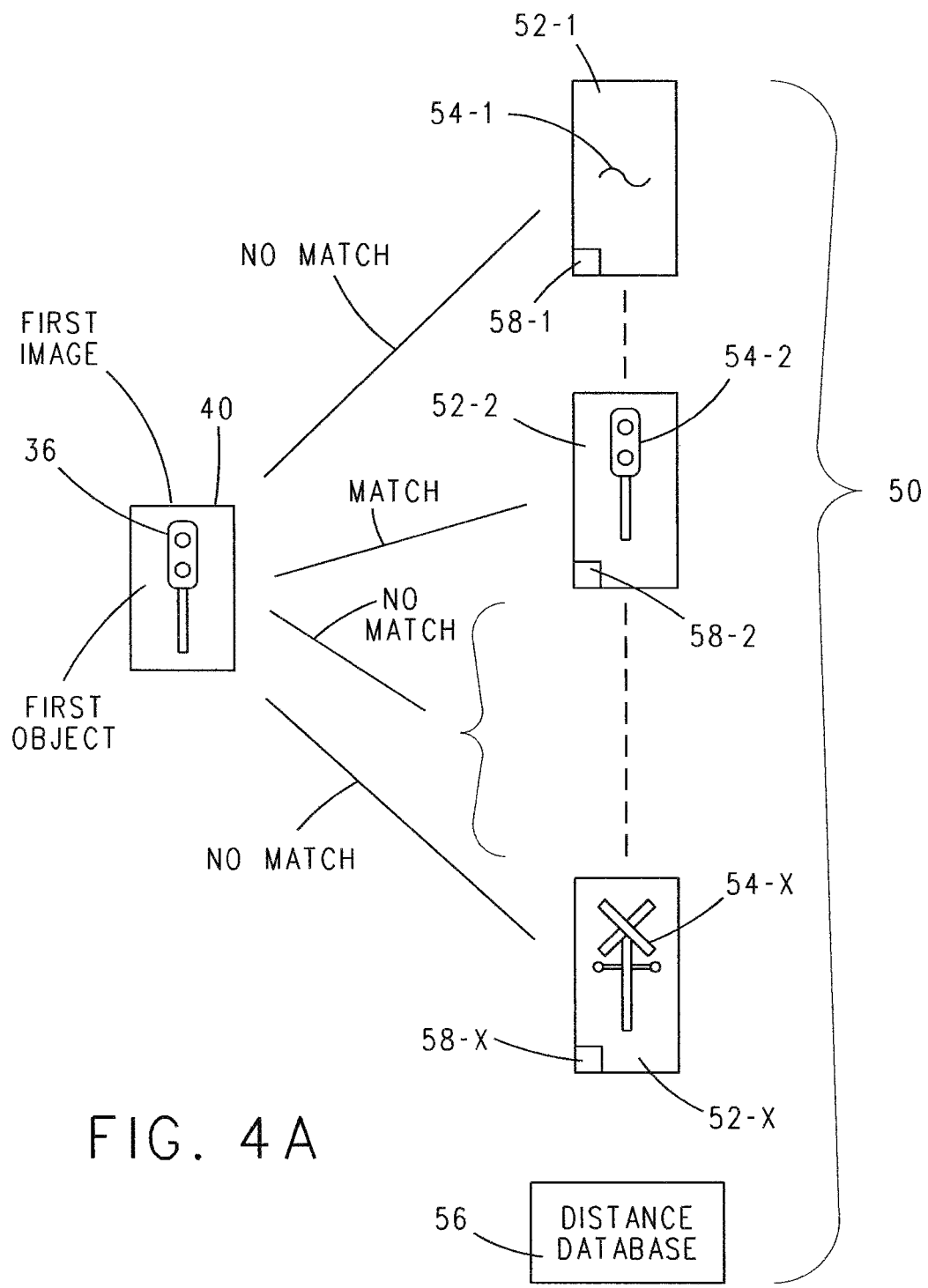
FIG. 4A is a schematic illustration of the comparison by the controller of FIG. 2 of an image acquired of one object in FIG. 1 with a number of images of objects stored in a track database accessible to the controller.
Figure 4B:
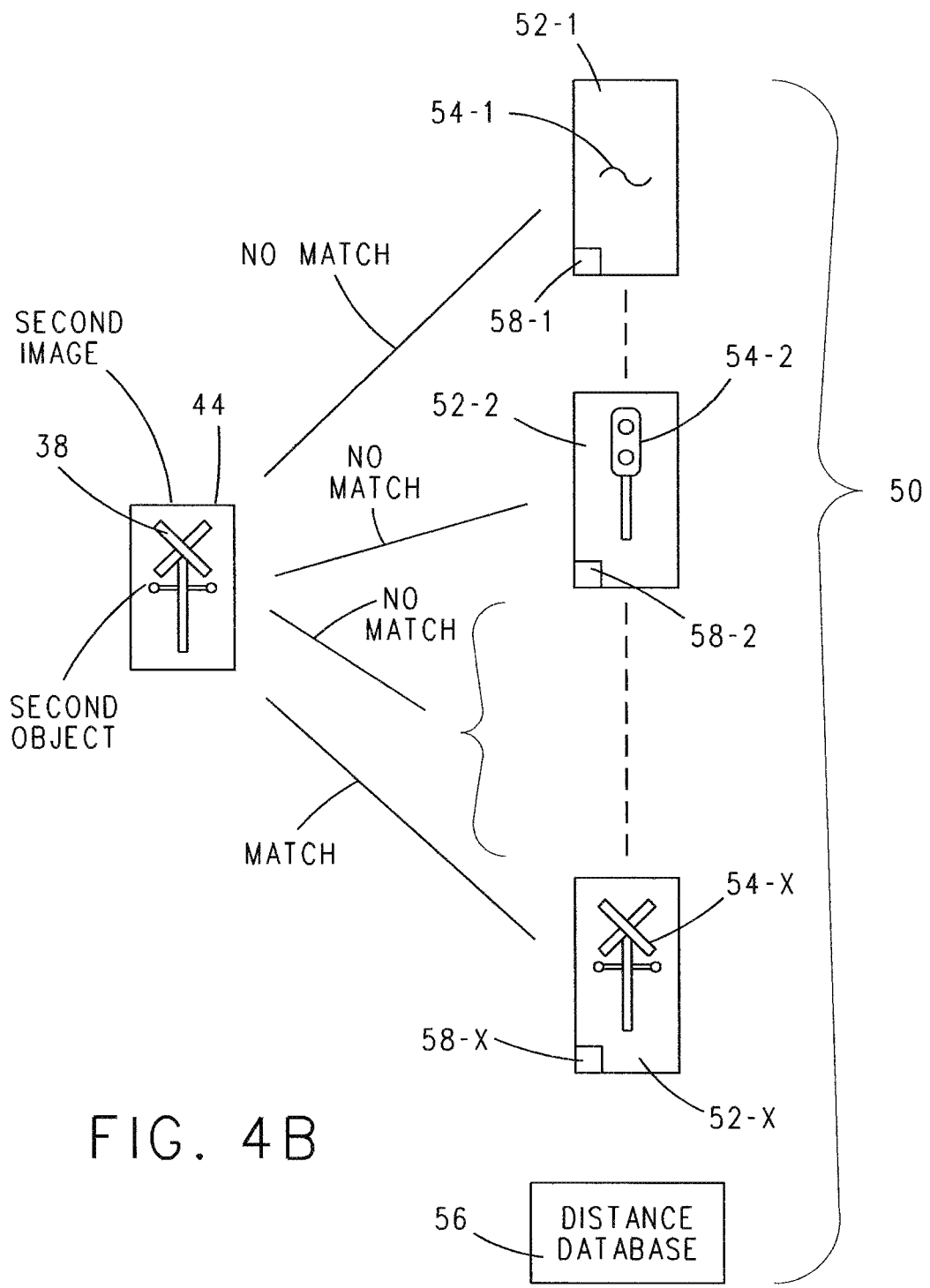
FIG. 4B is a schematic illustration of the comparison by the controller of FIG. 2 of an image acquired of the other object in FIG. 1 with the number of images of objects stored in the track database accessible to the controller.

With reference to FIGS. 4A-4B and with continuing reference to FIGS. 1-3, in one preferred and non-limiting embodiment or example, the step of determining a length of the train (step 96 in FIG. 3) can include searching a track database 50 for a match between each object 36 and 38 appearing in each image 40 and 44 and a corresponding representation of the object 54 stored in the track database 50, wherein the representation of the object 54 stored in track database 50 can be geotagged with a geographical location 58. The geotagged geographical location 58 associated with each representation of an object 54 stored in the track database 50 can be the actual geographical location of the corresponding physical object on or proximate path 42.

In one preferred and non-limiting embodiment or example, track database 50 can be stored in memory 20 of HEU 8 and/or EOT 12. Track database 50 can include a number of prerecorded images 52-1, 52-2, . . . , 52-X. Each image 52 can include a representation of the object (or picture) 54 corresponding to an actual physical object on or proximate path 42. Track database 50 can also include or have access to a distance database 56 that includes data from which the controller can determine a distance between any two actual, physical objects represented by prerecorded images 52 stored in track database 50. The data stored in distance database 56 enables the distance between one or more pairs of physical objects on or proximate path 42 to be determined for the length of path 42 extending therebetween. In this manner, if path 42 has straight sections, curved sections, or both, the actual distance that train 2 will travel on path 42 between said pair of objects can be determined from the data stored in distance database 56.

In one preferred and non-limiting embodiment or example, suppose that front facing camera 30 captures a first image 40 of first object 36 (FIG. 4A). In response, the controller can compare first image 40 including first object 36 to images 52 in track database 50 until the controller finds a match between first object 36 and object 54 stored in (appearing in) an image 52 of track database 50. In the example shown in FIG. 4A, first object 36 appearing in image 40 corresponds or matches to object 54-2 appearing in image 52-2 of track database 50. As shown in FIG. 4B, the controller can compare a second object 38 appearing in a second image 44 acquired by rear facing camera 32 to objects appearing in images 52 stored in track database 50 for a match. In FIG. 4B, a match between second object 38 in second image 44 and object 54-X appearing in image 52-X is shown.

In one preferred and non-limiting embodiment or example, each image 52 stored in track database 50 can include a geotagged geographical location 58 of the object 54 appearing in the image 52. In response to the controller determining a match between first object 36 of image 40 and object 54-2 of image 52-2 (FIG. 4A), the controller associates the geotagged geographical location 58-2 of object 54-2 with first object 36. Similarly, upon determining a match between second object 38 of image 44 and object 54-X of image 52-X (FIG. 4B), the controller associates the geotagged geographical location 58-X of object 54-X with second object 38. At this time, as can be seen, based on a match between objects 36 and 38 in images 40 and 44 acquired by cameras 30 and 32 and corresponding objects 54-2 and 54-X of images 52-2 and 52-X stored in track database 50, the controller can associate the geotagged geographical locations 58-2 and 58-X associated with the objects 54-2 and 54-X as the geographical locations 46 and 48 of first and second objects 36 and 38 on or proximate path 42. In this manner, first object 36 can be associated with geographical location 58-2 and second object 38 can be associated with second geographical location 58-X. In an example, geographical locations 46 and 48 can correspond to geographical locations 58-2 and 58-X acquired from track database 50.

Once the controller determines the first geographical location 46 of first object 36 and the second geographical location 48 of second object 38, the controller can access distance database 56 which can store therein an actual distance along path 42 between first object 36 and second object 38 and, more particularly, between geographical location 46 and geographical location 48.

In one preferred and non-limiting embodiment or example, the foregoing example assumed that first image 40 and second image 44 were acquired when train 2 is stationary, or at the same time (or approximately the same time) when train 2 is moving in order to enable the length 34 of train 2 to be determined to a desired degree of accuracy. Thus, in this example, the length of the train is determined based on a distance between first geographical location 46 (corresponding to geographical location 58-2 acquired from track database 50) and second geographical location 48 (corresponding to geographical location 58-X acquired from track database 50).

Figure 5A:
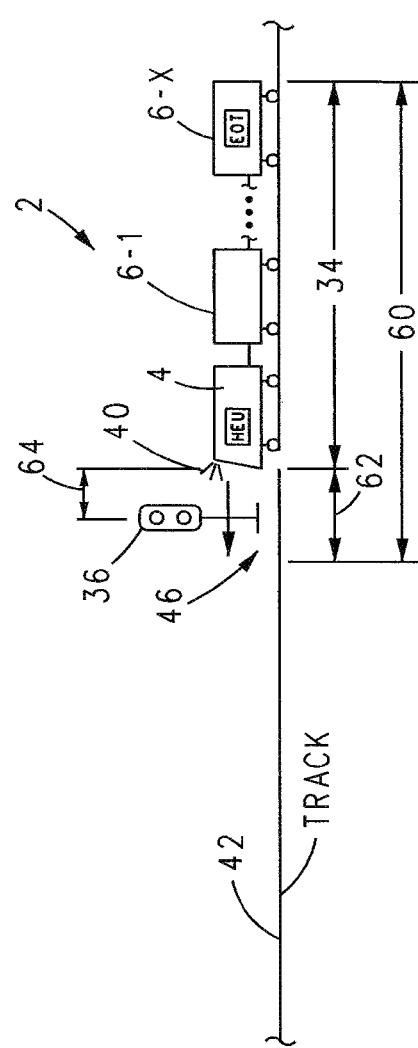
FIGS. 5A and 5B are schematic drawings of the cameras at the front of the train and the back or rear of the train shown in FIG. 2 acquiring images of a single object as the train of FIG. 1 travels along the path.
Figure 5B:
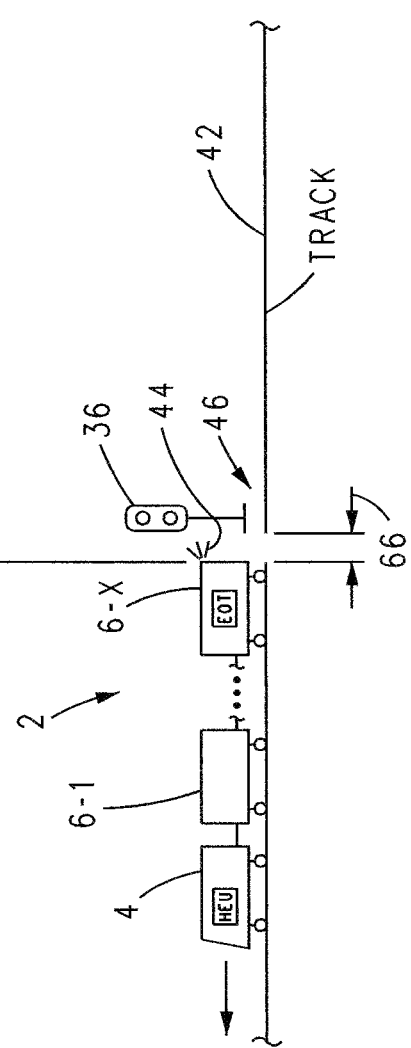

In one preferred and non-limiting embodiment or example, with reference to FIGS. 5A-5B and with continuing reference to all previous figures, first and second images 40 and 44 can be acquired while train 2 is traveling along path 42. In this example, the length 34 of train 2 can be determined based on a distance 60 determined by the controller that train 2 traveled between the acquisition of first image 40 and second image 44 including first and second objects 36 and 38. In this example, the first object and the second object can be the same object, e.g., first object 36. The geographical location 46 of first object 36 can be determined from the geotagged geographical location 58-2 acquired from track database 50 in the manner described above.

As can be understood from FIGS. 5A-5B, when first image 40 of first object 36 is acquired, because camera 30 is at the head of train 2 facing forward, there can be a distance or space 64 between first object 36 and the lens of camera 30 at the moment first image 40 of first object 36 is acquired. Similarly, when second image 44 of first object 36 is acquired, there can be a distance or space 66 between first object 36 and the lens of camera 32 at the moment second image 44 of first object 36 is acquired. The sum of these distances/spaces 64 and 66 can be a distance 62 which can be subtracted from distance 60 to arrive at the length 34 of train 2. The length or distance of each space 62 and 64 can be determined from first image 40 and second image 44 using an image distance measurement technique known in the art which will not be described further herein.

Figure 6A:
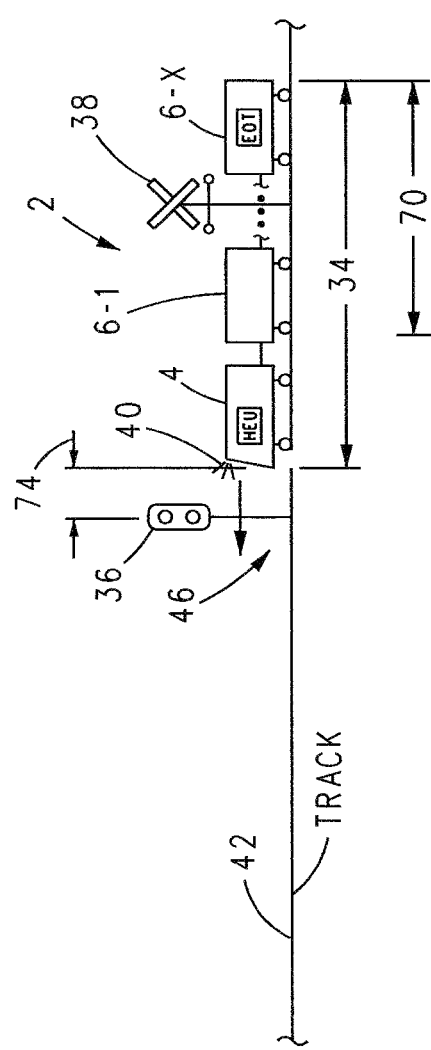
FIGS. 6A and 6B are schematic drawings of the cameras at the front of the train and the back or rear of the train shown in FIG. 2 acquiring images of two objects as the train of FIG. 1 travels along the path.
Figure 6B:
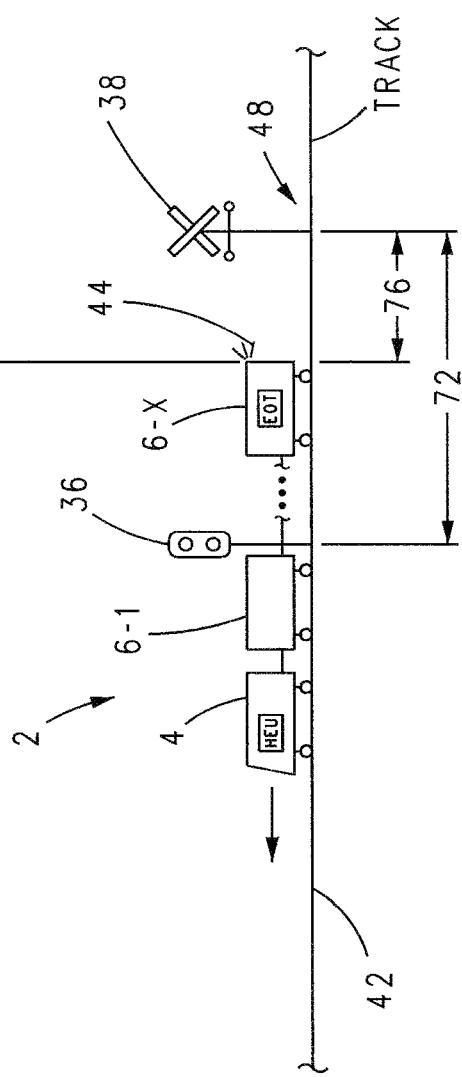

With reference to FIGS. 6A-6B and with continuing reference to all previous figures, in one preferred and non-limiting embodiment or example, instead of determining the length of the train based on taking first and second images 40 and 44 of a single object, e.g., first object 36, while train 2 is traveling on path 42, the length of train 2 can be determined by taking first and second images 40 and 44 of first and second objects 36 and 38 while train 2 is moving. The geographical locations 46 and 48 of first and second objects 36 and 38 can be determined from the geotagged geographical locations 58-2 and 58-X acquired from track database 50 in the manner described above.

In an example, suppose that camera 30 acquires first image 40 of first object 36 and, after traveling on path 42 (to the left in FIGS. 6A-6B), camera 32 acquires second image 44 of second object 38. Between the moments first image 40 and second image 44 are acquired, the controller can determine that train 2 travels distance 70. In an example, distance 70 can be determined by the controller in any manner, such as, for example, a count of a number of revolutions of a wheel of train 2 between the moments the first and second images 40 and 44 are acquired. However, this is not to be construed in a limiting sense. Via track database 50, the controller can determine that the distance between geographical locations 46 and 48 of first object 36 and second object 38 is distance 72. Utilizing an image distance measurement technique known in the art, the controller can determine a length or distance 74 between first object 36 and the lens of camera 30 at the moment first image 40 was acquired and can determine a length or distance 76 between second object 38 and the lens of camera 32 at the moment second image 42 was acquired. The length of train 34 can then be determined by taking the sum of distances 70 and 72 and subtracting therefrom distances 74 and 76.

As can be seen, in the example shown in FIGS. 5A-5B, the first and second objects can be the same object, namely, first object 36, and the first and second geographical locations can be the same geographical location, namely, geographical location 46 (58-2). In the example shown in FIGS. 6A-6B, the first and second objects can be different objects, namely, objects 36 and 38, and the first and second geographical locations 46 and 48 (58-2 and 58-X) can be different geographical locations.

In one preferred and non-limiting embodiment or example, as discussed above, the object representation 54 of each physical object 36 or 38 stored in track database 50 can be a prerecorded image or picture of said physical object.

In one preferred and non-limiting embodiment or example, determining the length of train 2 can be based on the path 42 of train 2 between the first geographical location 46 and the second geographical location 48. The path 42 of train 2 can include one or more of the following: a straight section, a curved section, or both.

In one preferred and non-limiting embodiment or example, determining the length of train 2 can include determining, based on the first image 40, the first geographical location 46 of first object 36 and determining, based on the second image 44, the second geographical location 48 of the second object 38. The length 34 of train 2 can then be determined based on a distance between the first and second geographical locations 46 and 48 determined from the geotagged geographical locations 58-2 and 58-X acquired from track database 50 in the manner described above.

In the example discussed above in connection with FIG. 1, the first and second images 40 and 44 can be acquired while the train is stationary. The length 34 of train 2 can be determined based on a distance of path 42 between the first and second geographical locations 46 and 48 determined from the geotagged geographical locations 58-2 and 58-X acquired from track database 50 in the manner described above. In one preferred and non-limiting embodiment or example, as discussed above, the controller can determine the distance from the first camera 30, in particular the lens of first camera 30, to first object 36 using an image distance measurement technique known in the art, and can determine the distance between second camera 32, in particular the lens of second camera 32, and the second object 38 using said image distance measurement technique.

Figure 7A:
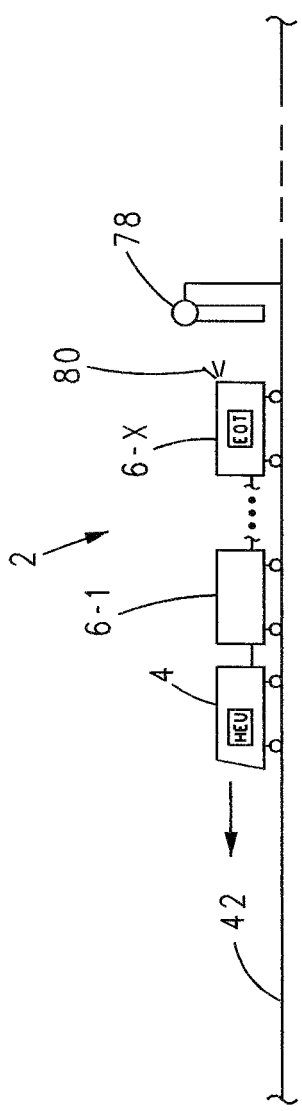
FIGS. 7A and 7B are schematic drawings of the camera at the back or rear of the train of FIG. 1 acquiring multiple images of an object for the purpose of determining if the object changes states.
Figure 7B:
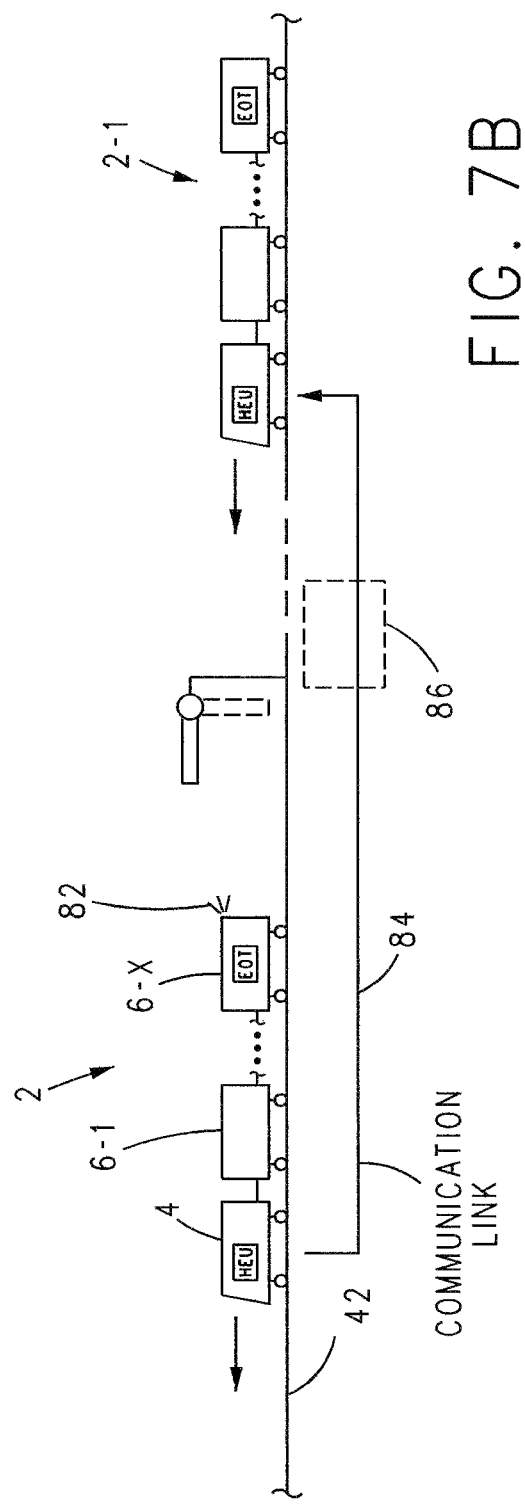

In one preferred and non-limiting embodiment or example, with reference to FIGS. 7A-7B, and with continuing reference to FIGS. 1-2, rear facing camera 32 can also be used to acquire multiple images of the same object, e.g., object 78, that can be processed by the controller which can determine, based on at least two of the images of object 78, that object 78 has changed state (or has not changed state). For example, as train 2 passes by object 78, camera 32 can acquire a first image 80 of object 78. Thereafter, as train 2 continues moving away from object 78, camera 32 can acquire a second image 82 of object 78. The controller can then determine, based on a comparison of the first and second images 80 and 82 if object 78 has changed from a first state (FIG. 7A) to a second state (FIG. 7B) or if object 78 has not changed state (as shown in phantom in FIG. 7B).

In one preferred and non-limiting embodiment or example, the controller can then communicate data that object 78 has changed state (or has not changed state) to the controller of another train 2-1 via a communication link 84. In one preferred and non-limiting embodiment or example, a transceiver, e.g., transceiver 26, of HEU 8 of train 2 can communicate the data that object 78 has changed state (or has not changed state) to a transceiver of a controller of train 2-1 via communication link 84. In an example, the controller of train 2-1 can be similar to the controller of train 2. Accordingly, a description of the particular elements comprising the controller of train 2-1 will not be described herein.

In one preferred and non-limiting embodiment or example, communication link 84 can couple the controller of train 2 in communication with the controller of train 2-1 directly, as shown by the solid line of communication link 84 in FIG. 7B, or via a separate communication node 86 such as, for example, a back office (shown in phantom) which can communicate data from the controller of train 2 to the controller of train 2-1, or vice versa.

In one preferred and non-limiting embodiment or example, a benefit of the controller of train 2-1 receiving from the controller of train 2 data that object 78 has changed state (or has not changed state) is that this data can be used in a manner known in the art for controlling the operation of train 2-1 based on the state of object 78. For example, if the state of object 78 shown by solid line in FIG. 7B is a signal for train 2-1 to stop, the data transferred to the controller of train 2-1 via communication link 84 can be utilized automatically or by an operator of train 2-1 to stop train 2-1 at or before object 78.

In one preferred and non-limiting embodiment or example, when provided, communication node 86 can be considered part of communication link 84. However, this is not to be construed in a limiting sense.

In one preferred and non-limiting embodiment or example, in any of the above described examples, the controller of train 2 can acquire from a GPS receiver of train 2, as train 2 travels past an object, the GPS coordinates from the GPS receiver. In an example, referring to FIGS. 1 and 2, GPS receiver 22 can acquire GPS coordinates when HEU 8 is proximate first object 36 and/or GPS receiver 24 can acquire GPS coordinates when EOT 12 is proximate second object 38. In an example, the acquisition of GPS coordinates by GPS receiver 22 and/or GPS receiver 24 can be coordinated with the acquisition of images 40 and/or 44 by camera 30 and/or camera 32, respectively. The acquired GPS coordinates can be used as a check that a geographical location associated with an object based on a geotagged geographical location 58 acquired from track database 50 is accurate. This can aid in ensuring that a geotagged geographical location 58 associated with an image 52 of track database 50 indeed corresponds to the actual or physical geographical location of the object appearing in the image acquired by camera 30 or 32.

For example, suppose rear facing camera 32 acquires an image of second object 38 and, on or about the same time, GPS receiver 24 acquires the GPS coordinates of EOT 12. Thereafter, in the manner described above, the controller of train 2 can search track database 50 for a match between second object 38 in image 40 and the corresponding object 54-2 appearing at image 52-2 stored in track database 50. Upon finding the match, the controller can associate the geotagged geographical location 58-2 of object 54-2 in track database 50 as the geographical location of actual second object 38, which, in an example, is located at actual geographical location 46.

Then, in this example, the controller of train 2 can compare the GPS coordinates acquired by GPS receiver 24 to the geographical location 46 (58-2) of second object 38 determined from the geotagged geographical location 58-2 obtained from image 52-2 to confirm that object 54-2 in image 52 is indeed the same as second object 38. In an example, the controller can determine whether the GPS coordinates acquired by GPS receiver 24 are within a predetermined distance of the geographical location 46 of second object 38 determined from the geotagged geographical location 58-2 of said object acquired from track database 50. If the acquired GPS coordinates are within a predetermined distance of the geotagged geographical location 58-2, the controller can be programmed or configured to determine the length 34 of train 2 in the manner described above. However, if the GPS coordinates are outside of the predetermined distance of the geotagged geographical location 58-2, as can occur if the controller incorrectly associates an object 54 in track database 50 with second object 38, the controller can be programmed or configured to take this determination as an indication that the geotagged geographical location 58-2 of second object 38 acquired from track database 50 is incorrect, whereupon the controller does use this data to determine the length 34 of train 2.

In one preferred and non-limiting embodiment or example, if the controller can determine the length 34 of train 2 based on geotagged geographical locations 58 acquired from two or more images 52 stored in track database 50 in the manner described above, the operation of the train 2 can be controlled based on the thus determined length 34 of train 2. On the other hand, if the length 34 of train 2 cannot be determined based on the geotagged geographical locations 58 acquired from two or more images 52 stored in track database 50, the operation of the train 2 can be controlled accordingly based on this determination. For example, the controller of train 2 may not permit operation of train 2 at least under certain circumstances, e.g., movement outside of a railroad yard.

In one preferred and non-limiting embodiment or example, in the above discussions in connection with FIGS. 5A-5B and FIGS. 6A-6B, the distances associated with spaces 64, 66, 74, and 76 can be determined, as discussed above, in a manner known in the art. Once the distance associated with each space 60, 66, 74, and 76 is known, each said distance can be utilized to update the geographical location of the corresponding camera and, more particularly, the lens of the corresponding camera for the purpose of determining the length 34 of train 2.

For example, upon the controller of train 2 determining distance 66 (FIG. 5B), the controller can determine an updated geographical location of camera 32 based on this distance 66 and geographical location 46 of first object 36 determined from geotagged geographical location 58-2 acquired from track database 50. Similar comments apply in respect of determining an updated geographical location of camera 30 based on a distance 64 (FIG. 5A) and the geographical location 46 of first object 36 determined from geotagged geographical location 58-2 acquired from track database 50. In an example, distance 64 from first object 36 to camera 30 (FIG. 5A) can be subtracted from geographical location 46 in the direction (vector) of locomotive 4 to determine the geographical location of camera 30 at the moment first image 40 is acquired. In an example, distance 66 from first object 36 to camera 32 (FIG. 5B) can be added to geographic location 46 in the direction (vector) of car 6-X to determine the geographical location of camera 32 at the moment second image 42 is acquired.

In one preferred and non-limiting embodiment or example, the thus determined updated geographical locations of cameras 30 and 32 can be utilized, along with the distance 60 train 2 travels in FIGS. 5A-5B, to determine the length of train 2 and can be used as a cross-check against GPS data acquired by GPS receivers 22 and 24 as train 2 travels by first object 36.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   generating, by a first camera mounted on a head of a train, a first image of a first object that is off-board the train and on or proximate a path of the train;
   generating, by a second camera mounted on an end of the train that is opposite the head, a second image of a second object that is off-board the train and on or proximate the path of the train; and
   determining, by a controller comprising one or more processors, a length of the train based on a first geographical location associated with the first object in the first image and a second geographical location associated with the second object in the second image.

2. The method of claim 1, further including the first and second images being generated while the train is travelling along the path of the train, wherein determining the length of the train is based on a distance travelled by the train between the generation of the first and second images including the first and second objects.

3. The method of claim 2, wherein:
   the first and second objects are the same object; and
   the first and second geographical locations are the same geographical location.

4. The method of claim 2, wherein:
   the first object and the second object are different objects; and
   the first and second geographical locations are different geographical locations.

5. The method of claim 1, wherein determining the length of the train includes:
searching a track database for a match between the first object appearing in the first image and a corresponding representation of the first object stored in the track database that is geotagged with a predetermined geographical location; and
based on a match between the first object in the first image and the corresponding representation of the first object stored in the track database, associating the predetermined geographical location as the first geographical location of the first object.

6. The method of claim 5, wherein the representation of the first object stored in the track database is another image of the first object.

7. The method of claim 1, wherein determining the length of the train is based on a distance along the path of the train between the first geographical location and the second geographical location.

8. The method of claim 7, wherein the path of the train includes one or more of a straight section or a curved section.

9. The method of claim 1, wherein the first and second images are generated while the train is stationary.

10. The method of claim 7, further including determining, by the controller,
a first distance from the first camera to the first object and a second distance from the second camera to the second object,
and the length of the train is determined by subtracting both the first distance and the second distance from the distance along the path of the train between the first geographical location and the second geographical location.

11. The method of claim 1, further including:
generating, by the second camera, at least two images of the second object;
determining, by the controller, based on the at least two images of the second object generated by the second camera, that the second object has changed state; and
communicating, by the controller via a communication link to another controller of another train, data that the second object has changed state.

12. The method of claim 11, wherein:
the communication link is a wired connection, a wireless connection, or a combination wired and wireless connection; and
the communication link communicatively couples the controller and the other controller directly or via a separate communication node.

13. The method of claim 1, further including:
generating, by the second camera, at least two images of the second object;
determining, by the controller, based on the at least two images of the second object generated by the second camera, that the second object has not changed state; and
communicating, by the controller via a communication link to another controller of another train, data that the second object has not changed state.

14. The method of claim 1, further including:
acquiring, by the controller from a GPS receiver mounted on the train at the head of the train as the head of the train travels proximate the first object, GPS coordinates of the GPS receiver;
determining, by the controller, whether the GPS coordinates of the GPS receiver that are acquired are within a predetermined distance of the first geographical location; and
controlling at least one operation of the train based on the determination of whether the GPS coordinates are within the predetermined distance of the first geographical location.

15. The method of claim 1, wherein determining the length of the train includes:
searching a track database for a match between the second object appearing in the second image and a corresponding representation of the second object stored in the track database, wherein the representation of the second object is geotagged in the track database with a predetermined geographical location; and
based on a match between the second object in the second image and the corresponding representation of the second object stored in the track database, associating the predetermined geographical location as the second geographical location of the second object.

16. The method of claim 15, wherein determining the length of the train further includes:
determining from the second image a distance from the second camera to the second object; and
determining, based on the distance from the second camera to the second object and the second geographical location of the second object, an updated geographical location of the second object.

17. The method of claim 1, wherein the first and second geographical locations are predetermined and stored in a track database, and the length of the train is determined by the controller: (i) matching the first object in the first image to a first object representation stored in the track database, (ii) identifying a predetermined geographical location that is associated with the first object representation in the track database as the first geographical location, (iii) matching the second object in the second image to a second object representation stored in the track database, (iv) identifying a predetermined geographical location that is associated with the second object representation in the track database as the second geographical location, and (v) determining a distance of the path of the train between the first and second geographical locations.

18. The method of claim 1, wherein the first camera is front-facing to generate image data that depicts an environment in front of the train based on a direction of movement of the train, and the second camera is rear-facing to generate image data that depicts an environment behind the train based on the direction of movement.

19. A system comprising:
a controller including one or more processors, the controller operably connected to a first camera mounted onboard a train at a first end of the train and operably connected to a second camera mounted onboard the train a second end of the train that is opposite the first end, wherein the controller is configured to receive a first image generated by the first camera and a second image generated by the second camera, the first image depicting a first object that is off-board the train and on or proximate to a path of the train, the second image depicting a second object that is off-board the train and on or proximate to a path of the train,
the controller configured to determine a first geographical location associated with the first object and a second geographical location associated with the second object, and determine a length of the train based on the first and second geographical locations and the path of the train between the first and second geographical locations.

20. The system of claim 19, wherein the controller is configured to determine the first geographical location associated with the first object by matching the first object in the first image to a first object representation stored in a track database, and identifying a predetermined geographical location that is associated with the first object representation in the track database as the first geographical location; and the controller is configured to determine the second geographical location associated with the second object by matching the second object in the second image to a second object representation stored in the track database, and identifying a predetermined geographical location that is associated with the second object representation in the track database as the second geographical location.

* * * * *